(12) United States Patent
Tseng (10) Patent No.: US 8,888,346 B2
(45) Date of Patent: Nov. 18, 2014

(54) ILLUMINATING SHOELACE DEVICE

(76) Inventor: Shen-Ko Tseng, Taipei (TW)

( * ) Notice: Subject to any disclaimer, the term of this patent is extended or adjusted under 35 U.S.C. 154(b) by 95 days.

(21) Appl. No.: 13/475,949

(22) Filed: May 19, 2012

(65) Prior Publication Data

US 2013/0308299 A1 Nov. 21, 2013

(51) Int. Cl.
| | |
|---|---|
| *A43B 5/00* | (2006.01) |
| *F21L 4/00* | (2006.01) |
| *F21S 4/00* | (2006.01) |
| *F21V 5/00* | (2006.01) |
| *F21V 21/08* | (2006.01) |
| *F21V 7/04* | (2006.01) |
| *H01L 33/00* | (2010.01) |
| *A41F 1/00* | (2006.01) |
| *A61M 1/00* | (2006.01) |
| *F21V 17/00* | (2006.01) |
| *G02B 6/00* | (2006.01) |
| *G02B 6/36* | (2006.01) |
| *A43B 3/00* | (2006.01) |
| *F21V 8/00* | (2006.01) |

(52) U.S. Cl.
CPC ............. *A43B 3/001* (2013.01); *G02B 6/0006* (2013.01)
USPC ............ 362/570; 362/103; 362/555; 362/581

(58) Field of Classification Search
CPC .... G01C 22/00; G02B 6/0001; G02B 6/0006; G02B 6/0023; A43B 3/0005; F21V 21/0832; F21V 33/0008; F21V 2008/00; F21K 9/52; F21Y 2113/002
USPC .......................... 362/551, 555, 570, 581, 103
See application file for complete search history.

(56) References Cited

U.S. PATENT DOCUMENTS

| | | | | |
|---|---|---|---|---|
| 2,557,663 | A | * | 6/1951 | Knode ............................ 40/541 |
| 4,447,121 | A | * | 5/1984 | Cooper et al. .................. 385/87 |
| 4,992,704 | A | * | 2/1991 | Stinson ......................... 315/312 |
| 5,430,621 | A | * | 7/1995 | Raskas .......................... 362/570 |
| 5,502,903 | A | * | 4/1996 | Barker ........................... 36/137 |
| 6,030,089 | A | * | 2/2000 | Parker et al. .................. 362/103 |
| 6,302,570 | B1 | * | 10/2001 | Petell et al. ................... 362/554 |
| 7,255,468 | B2 | * | 8/2007 | Capriola ....................... 362/570 |
| 7,429,123 | B2 | * | 9/2008 | Moore .......................... 362/555 |
| 2011/0271558 | A1 | * | 11/2011 | Rosko et al. ................... 36/137 |

\* cited by examiner

*Primary Examiner* — Robert May
*Assistant Examiner* — Alexander Garlen (57) ABSTRACT

An illuminating shoelace device includes an illuminating unit and a light guide fiber. The casing of the illuminating unit includes a first through hole and a first opening, and the illuminating unit includes the first light emitting element therein for emitting light to the first opening. One end of the light guide fiber passes through the first through hole and then is plugged in the first opening to receive the light emitted by the light emitting element. The first through hole and the fastening structure in the first opening can hold the light guide fiber to prevent it from falling out from the opening easily.

11 Claims, 9 Drawing Sheets

ILLUMINATING SHOELACE DEVICE

BACKGROUND OF THE INVENTION

1. Field of the Invention

This invention relates to an illuminating shoelace device, and more particularly, to the illuminating shoelace device used on the shoes for emitting light from the shoelace.

2. Description of the Prior Art

The clothing and other article of daily use are often designed to be specious and functional. For example, an illuminating device combined with the light guide fiber can be attached on the clothes, shoes, or other parts to emit light to embellish a light pattern, and to remind or warn other pedestrians or drivers to avoid accidents.

In the prior art, two types of illumination of the shoes of illuminating device in the shoe and the illuminating shoelace device are adopted. The illuminating shoelace device includes an illuminating unit which emits light by LED or lamp, and at least one light guide fiber connected to the LED or lamp. The light guide fiber can be used as the shoelace tied on the shoe, and then the illuminating shoelace device provides a visional effect on the vamp of the shoe.

The illuminating unit in the prior art has an opening corresponding to the LED or lamp inside the housing, and one end of the light guide fiber is plugged in the opening to receive the light emitted by LED or lamp. The received light is guided and travels in the light guide fiber (shoelace) for illuminating. In practice, the shoelaces must be adjusted to make the shoes to be suitable for one's feet, and those are also pulled and dragged when one wearing the shoes moves. The adjustment or the movement often causes the shoelaces to fall off from the illuminating unit, and then the illuminating shoelace device loses its efficacy.

Accordingly, it is an object of the present invention to provide a means to solve the problem in the prior art.

SUMMARY OF THE INVENTION

One object of the present invention is to provide a novel illuminating shoelace device to solve the problem in the prior art.

According to an embodiment of the invention, the illuminating shoelace device includes an illuminating unit and a light guide fiber, wherein the light guide fiber receives the light generated by the illuminating unit. The illuminating unit further includes a casing, a circuit board, a first light emitting element, and a power supply. The casing is formed by a first casing and a second casing connected to each other by screws, and has a containing space therein, a first through hole, and a first opening. The circuit board, the first light element, and the power supply are contained in the containing space of the casing, so that the light can be emitted from the first emitting element to the first opening.

One end of the light guide fiber passes through the first through hole and then is plugged in the opening hole. Besides, a fastening structure is configured on the inside wall around the first opening. The first through hole is capable of fixing the part of the light guide fiber between the first through hole and the first opening. Accordingly, the light guide fiber would not fall off from the first opening easily when the one wearing the shoes with the illuminating shoelace device moves or adjusts the shoelaces.

On the advantages and the spirit of the invention, it can be understood further by the following invention descriptions and attached drawings.

DETAILED DESCRIPTION OF THE INVENTION

Figure 1A:
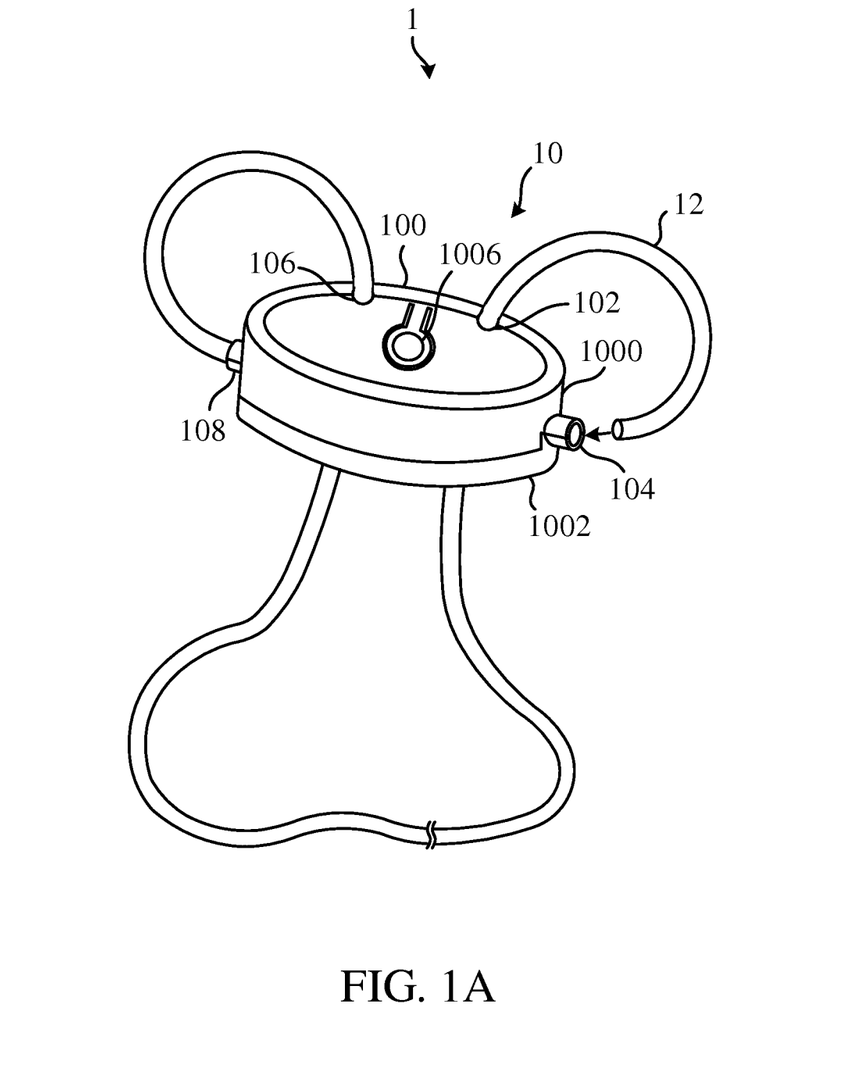
FIG. 1A is a schematic drawing illustrating an illuminating shoelace device according to an embodiment of the invention.
Figure 1B:
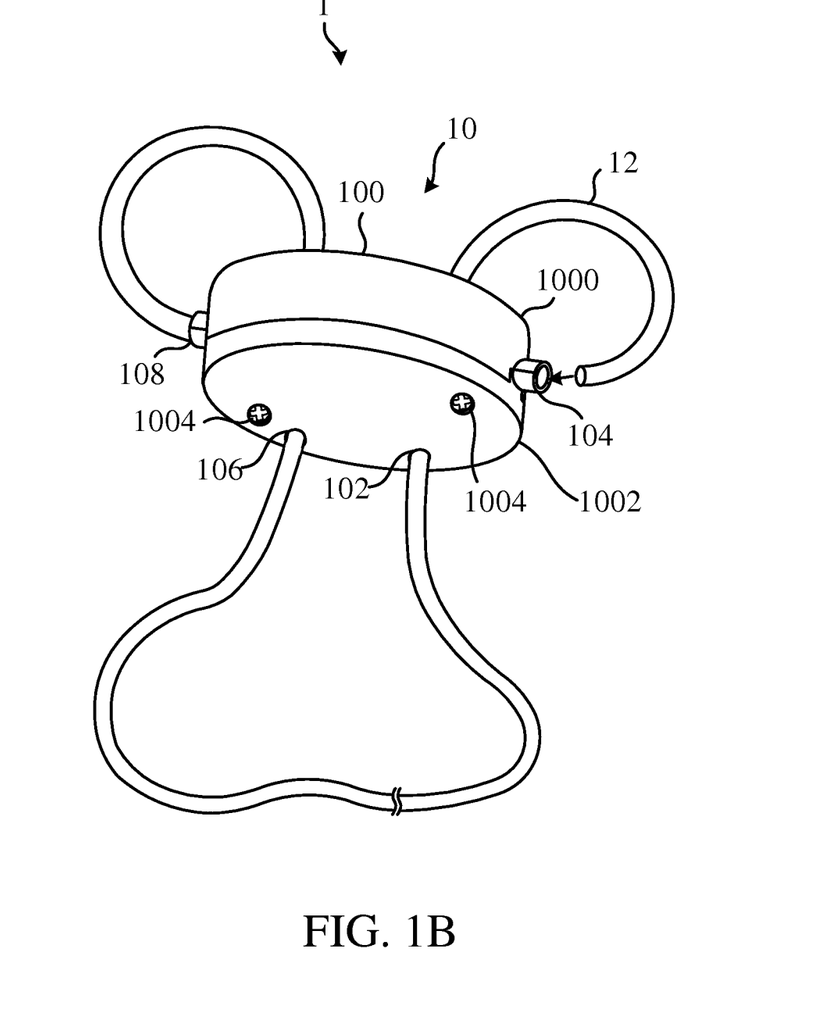
FIG. 1B is another view drawing illustrating the illuminating shoelace device in FIG. 1A.

Please refer to FIG. 1A and FIG. 1B. FIG. 1A is a schematic drawing illustrating an illuminating shoelace device 1 according to an embodiment of the invention, and FIG. 1B is another view drawing illustrating the illuminating shoelace device 1 in FIG. 1A. As shown in FIGS. 1A and 1B, the illuminating shoelace device 1 includes an illuminating unit 10 and a light guide fiber 12 connected to the illuminating unit 10. The illuminating unit 10 includes a casing 100, which is formed by a first casing 1000 and a second casing 1002 connected to each other, having a first through hole 102, a first opening 104, a second through hole 106, and a second opening 108 thereon.

The first casing 1000 and the second casing 1002 are connected to each other by screws 1004. In this embodiment, there are two screws 1004 for connecting the first casing 1000 and the second casing 1002, however, the amount of the screws 1004 can be increased or decreased according to the requirements of the user or the designer, but not limited to the embodiment shown in FIG. 1B. The first through hole 102, the firs opening 104 are configured on the casing 100 and opposite to the second through hole 106 and the second opening 108. In another embodiment, the positions of the first through hole 102, the firs opening 104, the second through hole 106, and the second opening 108 can be other locations on the casing 100 according to the requirements of the user or the designer.

Figure 2:
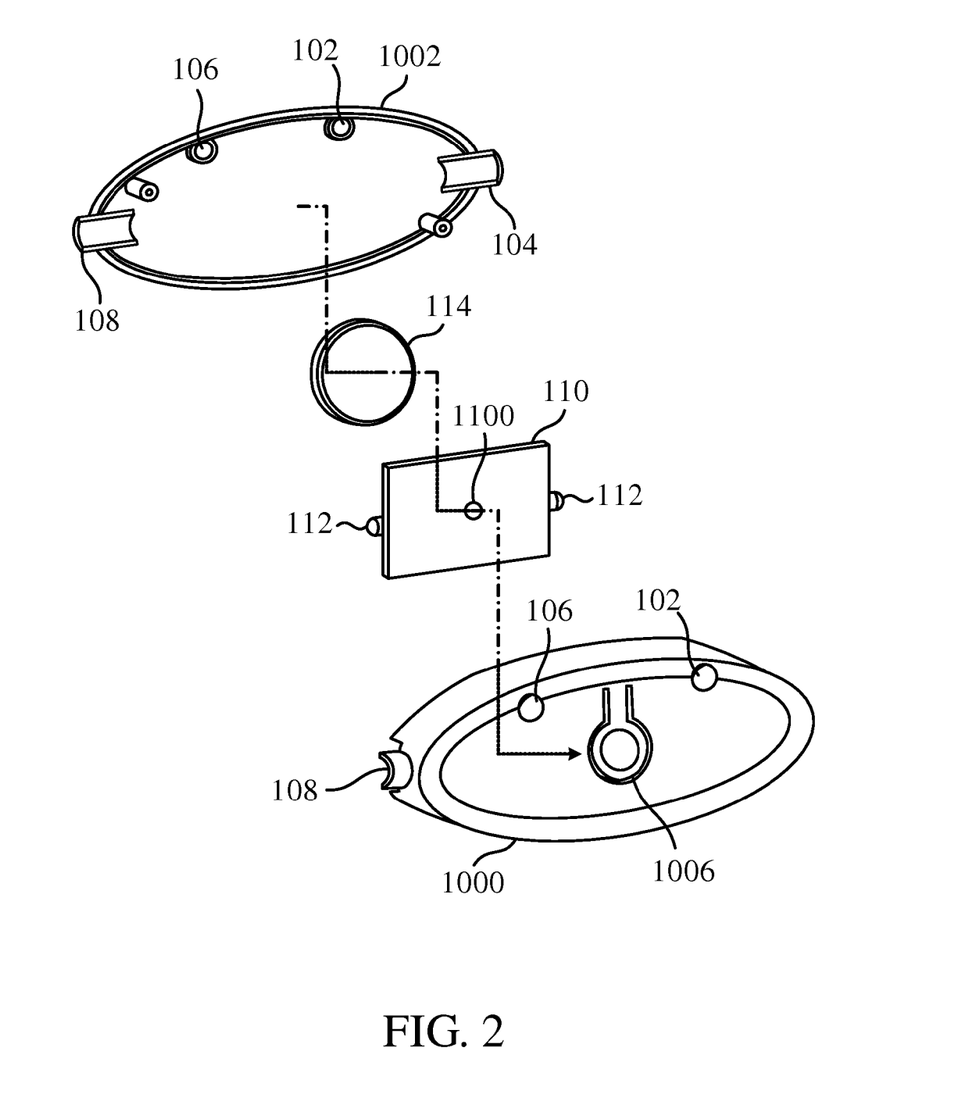
FIG. 2 is an explosion drawing illustrating the illuminating unit in FIG. 1A.

Please refer to FIG. 2. FIG. 2 is an explosion drawing illustrating the illuminating unit 10 in FIG. 1A. As shown in FIG. 2, the first casing 1000 and the second casing 1002 together form the casing 100 and a containing space in the casing 100. The illuminating unit 10 further includes a circuit board 110, two light emitting element 112, and a power supply 114 contained in the containing space of the casing 100. The light emitting elements 112 are configured on two opposite sides of the circuit board 110, and the positions of the two light emitting elements 112 are respectively corresponding to the first opening 104 and the second opening 108.

The power supply 114 is electrically connected to the circuit board 110 and provides electric power to the circuit board 110 and the light emitting elements 112 during operation.

The circuit board 110 further includes a switch 1100 to control the light emitting elements 112 to emit light. Please refer to FIG. 1A again, the casing 100 of the illuminating unit 10 includes a button 1006 corresponding to the switch 1100. The button 1006 can be pressed by the user to trigger the switch 1100 for controlling the light emitting elements 112 to emit light. The light emitting manner of the light emitting elements 112 can also be controlled by the circuit board 110 and the button 1006 too. For example, the light emitting elements 112 is controlled to continuously emit light after the user presses the button, and discontinuously emit light after the user presses the button again. In this embodiment, the button 1006 is integrated with the casing 100, however, the button can be a separable part, such as an elastic member, configured on the casing in practice.

In this embodiment, the light guide fiber 12 is flexible to be the shoelace of the shoe. One end of the light guide fiber 12 is capable of passing the first through hole 102, and then being plugged in the first opening 104. The other end of the light guide fiber 12 is capable of passing the second through hole 106, and then being plugged in the second opening 108. As described above, the light emitting elements 12 are respectively corresponding to the first opening 104 and the second opening 108, so that the two ends of the light guide fiber 12 can receive the light emitted by the light emitting elements 12 in the first opening 104 and the second opening 108. The light received from two ends travels in the light guide fiber 12 so as to illuminate the whole light guide fiber 12. In another embodiment, the illuminating unit further includes sleeves in the first opening and second opening respectively, wherein the sleeves sleeve the first emitting element and one end of the light guide fiber, and sleeve the second emitting element and the other end of the light guide fiber. The light emitted by the first emitting element and the second emitting element can be blocked by the sleeves from spreading out, and then improve the light using efficiency. In another embodiment, one light guide fiber can pass through the first through hole and be plugged in the first opening, and another light guide fiber can pass through the second through hole and be plugged in the second opening. In this embodiment, the illuminating unit emits light to illuminate the two light guide fibers.

As the light guide fiber 12 passes through the first through hole 102 and the second through hole 106, the inside walls and the edges around the first through hole 102 and the second through hole 106 provide friction force to hold the light guide fiber 12. That is to say, the parts of the light guide fiber 12 between the first through hole 102 to the first opening 104 and between the second through hole 106 to the second opening 108 are fixed, and the two ends of the light guide fiber 12 would not fall out from the first opening 104 and the second opening 108 easily when one wearing the shoe moves or adjusts the shoelace. On the other hand, the length of the shoelace (the light guide fiber 12) can be adjusted and then fixed by the friction force.

Figure 3A:
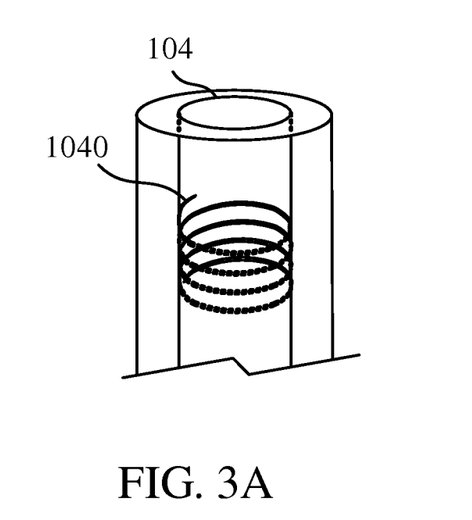
FIG. 3A is a sectional drawing illustrating the first opening in FIG. 1A according to an embodiment of the invention.
Figure 3B:
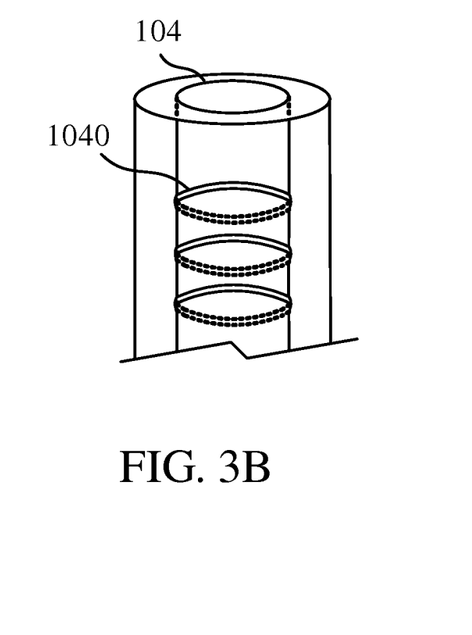
FIG. 3B is a sectional drawing illustrating the first opening in FIG. 1A according to another embodiment of the invention.
Figure 3C:
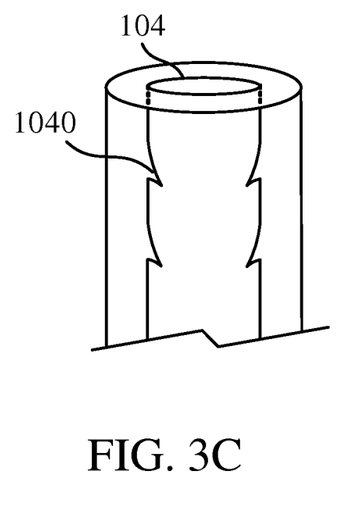
FIG. 3C is a sectional drawing illustrating the first opening in FIG. 1A according to another embodiment of the invention.

Please refer to FIGS. 3A, 3B, and 3C. FIG. 3A is a sectional drawing illustrating the first opening 104 in FIG. 1A according to an embodiment of the invention, and FIGS. 3B, 3C are sectional drawings illustrating the first opening 104 in FIG. 1A according to another embodiment of the invention. As shown in FIGS. 3A, 3B, and 3C, the inside wall of the casing 100 around the first opening 104 forms a fastening structure 1040 thereon. The fastening structure 1040 includes a spiral groove (in FIG. 3A), a plurality of notches (in FIG. 3B), a plurality of protrusions, or the combination of the spiral groove, the notches, and the protrusions. The fastening structure 1040 provides friction force on the end of the light guide fiber 12 plugged in the first opening 104, so as to hold it in the first opening 104. In another embodiment, the end of the light guide fiber 12 is capable of including the structure corresponding to the fastening structure 1040, so as to further strengthens the friction force between the inside wall and the end of the light guide fiber 12. In the above embodiments, the inside wall of the casing 100 around the second opening 108 also forms another fastening structure to provide friction force on the other end of the light guide fiber 12 to hold it in the second opening 108.

Figure 4:
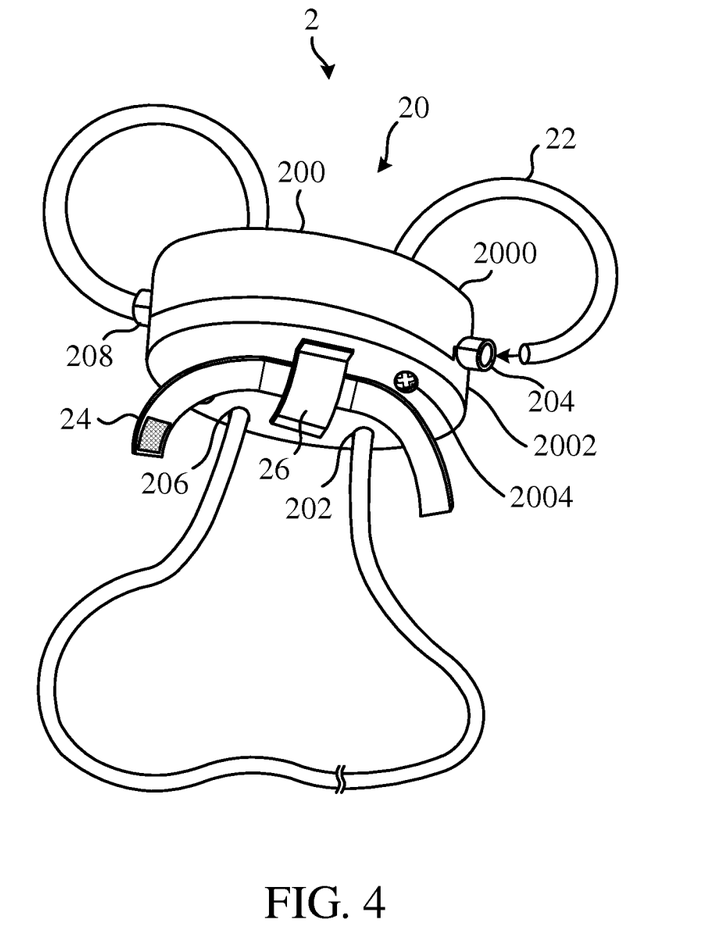
FIG. 4 is a schematic drawing illustrating an illuminating shoelace device according to another embodiment of the invention.

Please refer to FIG. 4. FIG. 4 is a schematic drawing illustrating an illuminating shoelace device 2 according to another embodiment of the invention. As shown in FIG. 4, the illuminating shoelace device 2 includes a sticking member 24 and a connecting component 26 for connecting the sticking member 24 on the casing 200 of the illuminating unit 20. The connecting component 26 is configured on the casing 200 and is capable of tying the sticking member 24 on the casing 200, so that the sticking member 24 is removable from the illuminating unit 20. In this embodiment, the sticking member 24 is a velcro, which is capable of encompassing the tongue of the shoe from one side of the tongue and then sticking at the other side of the tongue. In practice, the sticking member 24 can be other types of velcro or other objects. For example, one part of the velcro is configured on the casing of the illuminating unit and the other part of the velcro is configured on the tongue of the shoe, so that the illuminating unit can be stuck on the tongue. In another embodiment, the velcro can be replaced with a buckle to connect the tongue and the illuminating unit.

Figure 5:
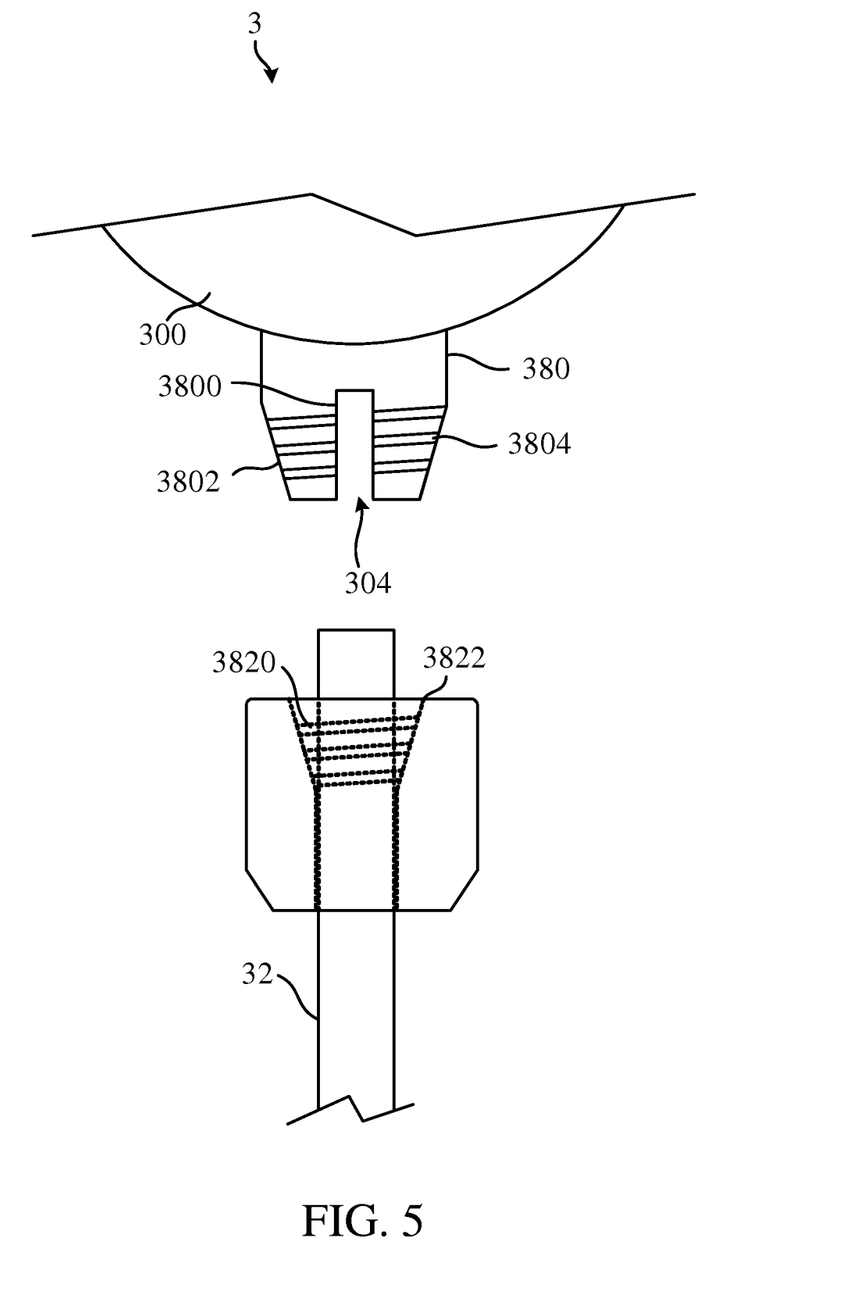
FIG. 5 is a schematic drawing illustrating an illuminating shoelace device according to another embodiment of the invention.

Please refer to FIG. 5. FIG. 5 is a schematic drawing illustrating an illuminating shoelace device 3 according to another embodiment of the invention. As shown in FIG. 3, the difference between this embodiment and the above-mentioned embodiments is that the illuminating shoelace device 3 further includes a connector 380 configured on the casing 300 and around the first opening 304 and a connector sheath 382 configured on one end of the light guide fiber 32. The connector sheath 382 is capable of containing a part of the connector 380 when the end of the light guide fiber 32 is plugged in the first opening 304. The connector 380 has a rift 3800 extended from the first opening 304, an inclined surface 3802 around the first opening 304, and a first screw thread 3804 around the rift 3800. The connector sheath 382 therein has a second screw thread 3820 corresponding to the first screw thread 3804, and an inclined structure 3822 corresponding to the inclined surface 3802.

When the light guide fiber 32 is plugged in the first opening 30, a part of the connector 380, including the rift 3802 and the inclined surface 3802, is capable of connecting with the connector sheath 382 by the first screw thread 3804 and the second screw thread 3820, and being contained in the connector sheath 382 simultaneously. In this embodiment, the diameter of the space in the connector sheath 382 is gradually decreased along the inclined structure 3822. That is to say, when the connector 380 connects with the connector sheath 382 by the first screw thread 3804 and the second screw thread 3820, the walls near the rift 3800 draw close to each other by the means that the inclined surface 3802 slides along the inclined structure 3820, resulting in the decrease to the diameter of the first opening 304, so that the walls press the light guide fiber 32 to fix it in the first opening 304.

Figure 6:
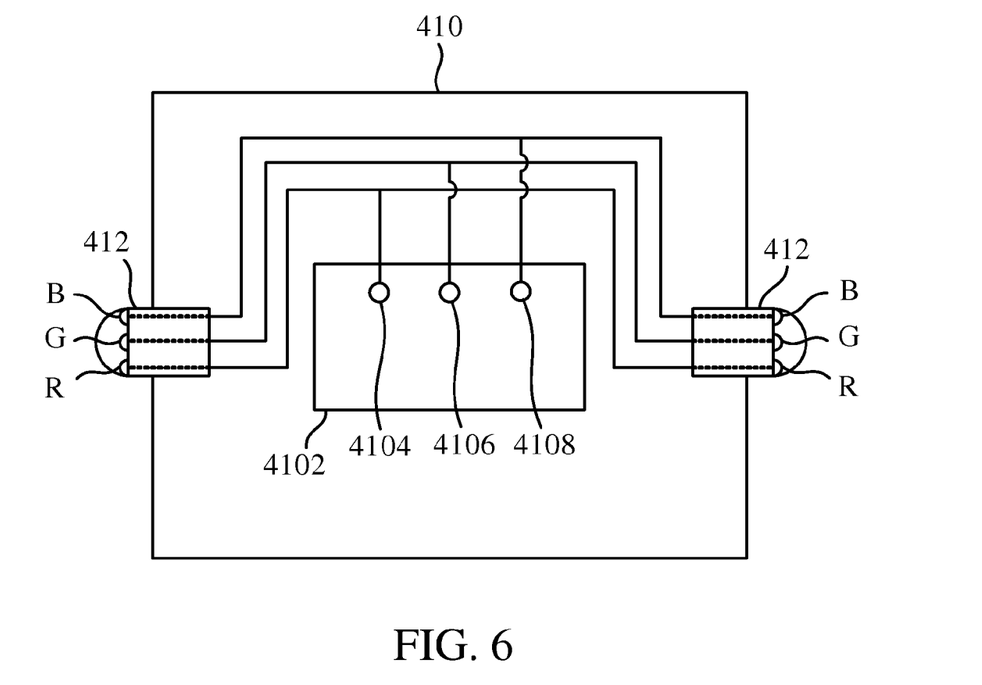
FIG. 6 is a schematic drawing illustrating a circuit board and light emitting elements of an illuminating shoelace device according to another embodiment of the invention.

Please refer to FIG. 6. FIG. 6 is a schematic drawing illustrating a circuit board 410 and light emitting elements 412 of an illuminating shoelace device according to another embodiment of the invention. In this embodiment, the circuit board 410 includes a processing circuit 4102, and the each of the light emitting elements 412 includes a red light member R, a green light member G, and a blue light member B. The processing circuit 4102 further includes a red light terminal 4104, a green light terminal 4106, and a blue light terminal 4108 connected to the red light member R, the green light member G, and the blue light member B respectively, so as to control the three light members to generate monochromatic lights respectively. The monochromatic lights generated by the three light members respectively form the light with various colors. The light emitting manner of the light members can be controlled by the processing circuit 4102, so that the shoelace can show various light patterns. For example, the light members R, G, and B are controlled to continuously emit monochromatic lights to form a continuous color light, or discontinuously emit monochromatic lights to form a glimmered color light.

Figure 7:
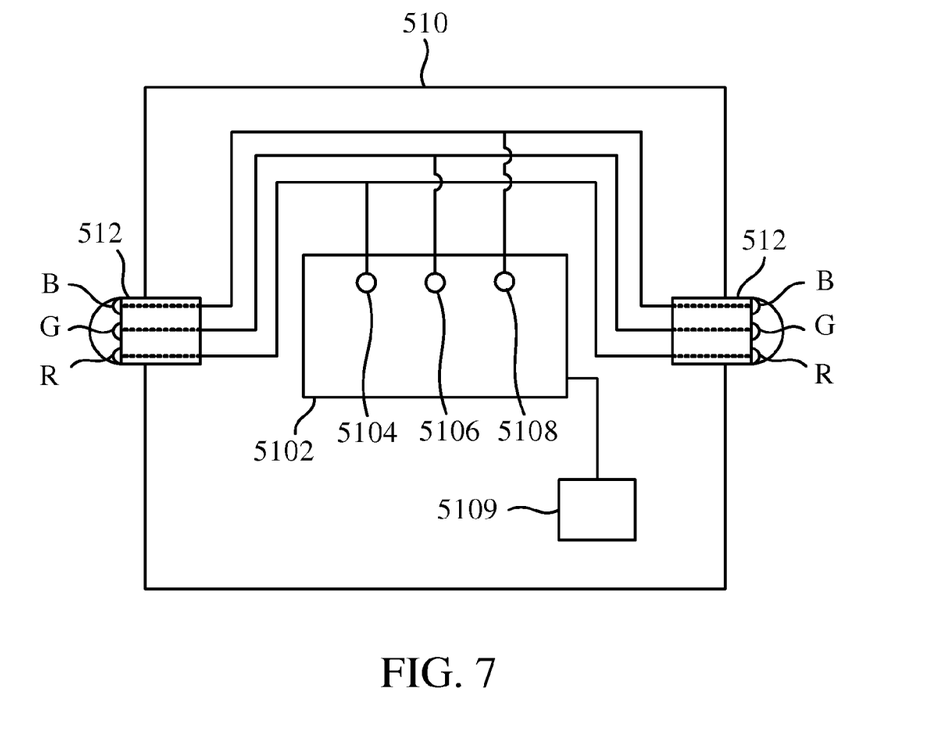
FIG. 7 is a schematic drawing illustrating a circuit board and light emitting elements of an illuminating shoelace device according to another embodiment of the invention.

Please refer to FIG. 7. FIG. 7 is a schematic drawing illustrating a circuit board 510 and light emitting elements 512 of an illuminating shoelace device according to another embodiment of the invention. In this embodiment, the circuit board 510 further includes a pedometer 5109 which is connected to the processing circuit 5102. When the illuminating shoelace device is configured on a shoe, the pedometer 5109 can count the amount of steps of one who wears the shoe. According to the amount of steps, the processing circuit 5102 of the circuit board 510 controls the three light members to generate color light by a light emitting manner. For example, when the amount of steps exceeds ten thousands, the light emitting elements 512 change the color of light from one to another, and the user wearing the shoe knows that how many steps he walks by the light of the shoelace.

Compared to the prior art, the illuminating shoelace device of the invention includes the illuminating unit and the light guide fiber connected to the illuminating unit. The casing of the illuminating unit has through holes and openings, and the ends of the light guide fiber pass through the through holes and then are plugged in the openings respectively to receive the light. The through holes and the fastening structure in the opening provide friction force to hold the light guide fiber, so that the ends of the light guide fiber would not fall off from the openings easily when one wearing the shoes adjusts the shoelace or moves.

Although the present invention has been illustrated and described with reference to the preferred embodiment thereof, it should be understood that it is in no way limited to the details of such embodiment but is capable of numerous modifications within the scope of the appended claims.

What is claimed is:

1. An illuminating shoelace device, comprising:
    an illuminating unit, comprising:
        a casing, comprising a first casing and a second casing connected to each other, the casing having a containing space therein, a first through hole, and a first opening, the first opening having a tunnel shaped structure, the tunnel shaped structure having an inside wall formed on an internal surface of the tunnel shaped structure, a fastening structure being formed on the inside wall;
        a plurality of screws, securing the first casing with the second casing;
        a circuit board, contained in the containing space;
        a first light emitting element, configured on the circuit board and corresponding to the first opening; and
        a power supply, contained in the containing space and electrically connected to the circuit board; and
    a light guide fiber, one end of the light guide fiber passing through the first through hole and being plugged in the first opening and being contacted and fastened by the fastening structure so as to receive the light emitted by the first light emitting element;
    a connector, configured on the casing and around the first opening, the connector comprising a rift extending from the first opening, an inclined surface around the first opening, and a first screw thread around the rift; and
    a connector sheath, configured on one end of the light guide fiber, the connector sheath therein having a second screw thread corresponding to the first screw thread and an inclined structure corresponding to the inclined surface, the connector sheath being capable of connecting with the connector by the first screw thread and second screw thread to fix the light guide fiber when the end of the light guide fiber is plugged in the first opening and fixed with the inside wall.

2. The illuminating shoelace device of claim 1, wherein the fastening structure comprises a spiral groove.

3. The illuminating shoelace device of claim 1, wherein the fastening structure comprise a plurality of notches formed on the inside wall for securing the light guide fiber therewith.

4. The illuminating shoelace device of claim 1, wherein the illuminating unit further comprises a sticking member connected to the casing, the sticking member is used for sticking the illuminating unit on a shoe.

5. The illuminating shoelace device of claim 4, wherein the illuminating unit further comprises a connecting component for connecting the stick member to the casing, and the sticking member comprises a hook and loop fastener.

6. The illuminating shoelace device of claim 1, wherein the casing comprises a second opening opposite to the first opening and a second through hole opposite to the first through hole, and the illuminating unit comprises a second light emitting element configured on the circuit board and corresponding to the second opening.

7. The illuminating shoelace device of claim 6, wherein the other end of the light guide fiber passes through the second through hole and being plugged in the second opening to receiving the light emitted by the second light emitting element.

8. The illuminating shoelace device of claim 1, wherein the casing comprises a button and the circuit board comprises a switch corresponding to the button, the button and the switch are used for controlling the first light emitting element to emit light.

9. The illuminating shoelace device of claim 1, wherein the button is one piece formed with the casing.

10. The illuminating shoelace device of claim 1, wherein the circuit board comprises a processing circuit including a blue light terminal, a red light terminal, and a green light terminal, and the first light emitting element comprises a blue light, a red light member, and a green light member respectively electrically connected to the blue light terminal, the red light terminal, and the green light terminal, so that the processing circuit controls the first light emitting element to generate light by a light emitting manner.

11. The illuminating shoelace device of claim 1, wherein the circuit board comprises a pedometer for counting the amount of steps, and the circuit board controls the first light emitting element to generate light by a light emitting manner according to the amount of steps.

* * * * *